United States Patent
Cozzens et al.

(10) Patent No.: US 10,899,870 B2
(45) Date of Patent: Jan. 26, 2021

(54) NON-SOFTENING RESILIENT THERMOPLASTIC POLYURETHANES

(71) Applicant: Lubrizol Advanced Materials, Inc., Cleveland, OH (US)

(72) Inventors: David Cozzens, Lowell, MA (US); Pallavi Kulkarni, Woburn, MA (US); Anthony J. Walder, Essex, MA (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

(21) Appl. No.: 15/514,831

(22) PCT Filed: Oct. 1, 2015

(86) PCT No.: PCT/US2015/053406
§ 371 (c)(1),
(2) Date: Mar. 28, 2017

(87) PCT Pub. No.: WO2016/054320
PCT Pub. Date: Apr. 7, 2016

(65) Prior Publication Data
US 2017/0226272 A1    Aug. 10, 2017

Related U.S. Application Data

(60) Provisional application No. 62/058,223, filed on Oct. 1, 2014.

(51) Int. Cl.
| | |
|---|---|
| C08G 18/72 | (2006.01) |
| C08G 18/75 | (2006.01) |
| C08G 18/66 | (2006.01) |
| C08G 18/73 | (2006.01) |
| C08G 18/32 | (2006.01) |
| C08G 18/48 | (2006.01) |
| C08L 75/08 | (2006.01) |

(52) U.S. Cl.
CPC ....... *C08G 18/722* (2013.01); *C08G 18/3206* (2013.01); *C08G 18/4833* (2013.01); *C08G 18/4854* (2013.01); *C08G 18/6674* (2013.01); *C08G 18/73* (2013.01); *C08G 18/757* (2013.01); *C08G 18/758* (2013.01); *C08L 75/08* (2013.01); *C08L 2203/02* (2013.01)

(58) Field of Classification Search
CPC .............. C08G 18/722; C08G 18/4833; C08G 18/3206; C08G 18/758; C08G 18/4854; C08G 18/6674; C08G 18/73; C08G 18/757; C08L 75/08; C08L 2203/02
See application file for complete search history.

(56) References Cited

U.S. PATENT DOCUMENTS

| | | | |
|---|---|---|---|
| 2001/0053841 A1 | 12/2001 | Kaufhold et al. | |
| 2003/0032754 A1* | 2/2003 | Kaufhold | C08G 18/6674 528/44 |
| 2009/0143169 A1* | 6/2009 | Shiga | C08G 18/10 473/378 |
| 2010/0216905 A1* | 8/2010 | Kuwamura | B29C 41/18 521/170 |
| 2010/0227985 A1* | 9/2010 | Nishiguchi | B29C 41/18 525/453 |
| 2015/0266275 A1* | 9/2015 | Scherzer | A63B 71/022 428/138 |
| 2016/0237197 A1* | 8/2016 | Persoons | C08G 18/4854 |
| 2016/0311964 A1* | 10/2016 | Marin | C08G 18/4854 |

OTHER PUBLICATIONS

Shore Durometer Conversion Chart; Polymer Properties Database; polymerdatabase.com; 2015; p. 1. (Year: 2015).*

* cited by examiner

*Primary Examiner* — Rabon A Sergent
(74) *Attorney, Agent, or Firm* — Thoburn Dunlap; Michele Tyrpak

(57) ABSTRACT

The thermoplastic polyurethane (TPU) compositions described herein have a very good snap back properties (also called rebound resilience) while still maintaining a good combination of other properties, including hardness, low-temperature flexibility, abrasion resistance, weather-ability, low density, or any combination thereof. This combination of properties make the TPU compositions described herein useful materials for applications where polyamide copolymers (COPA) and/or polyether block amide (PEBA) materials have traditionally been used over TPU.

13 Claims, No Drawings

NON-SOFTENING RESILIENT THERMOPLASTIC POLYURETHANES

CROSS REFERENCE TO RELATED APPLICATION

This application claims priority from PCT Application Serial No. PCT/US2015/053406 filed on Oct. 1, 2015, which claims the benefit of U.S. Provisional Application No. 62/058,223 filed on Oct. 1, 2014, both of which are incorporated in their entirety by reference herein.

FIELD OF THE INVENTION

There is provided herein thermoplastic polyurethane (TPU) compositions having non-softening and wet flexibility properties. Such combination of properties make the TPU compositions described herein useful materials for applications where polyamide copolymers (COPA) and/or polyether block amide (PEBA) materials have traditionally been used over TPU, especially in medical applications where chemical stability and compatibility in an in vivo environment are important.

BACKGROUND

Thermoplastic polymers, copolymers, and polymer blends have been used extensively in the fabrication of medical devices, including a wide range of long term and short term implant devices. Many polymers and polymer blends used in medical devices have specific physical and chemical properties which make them particularly suitable for in vivo applications. Preferred chemical, physical and thermomechanical properties depend upon the specific function, the type of tissue, cells or fluids contacting the medical device and the acceptable or desired manufacturing processes. Major considerations in choosing polymers for medical devices include the chemical stability of the polymer, particularly hydrolytic stability, the toxicity of the polymer, and the degree of interaction between tissue or blood and the polymer. Additionally, the polymer or polymer blend should meet all the physical demands relating to the function of the medical device including strength, compliance, stiffness, flexibility and rebound properties.

Certain medical devices, such as catheters, represent a particularly large class of medical devices used for a variety of in vivo applications. Typically catheter bodies are formed of one type of polymer, but more than one type can be incorporated into the catheter body in order to provide a device which meets the catheter's physical and chemical requirements. Specific types of catheters are widely utilized in a variety of procedures and are physically designed to be maneuvered through tortuous fluid pathways within a body to a preselected site.

In order to safely maneuver such devices into place, the material used to fabricate the device should have sufficient flexibility and low enough bend stiffness to avoid perforating or otherwise harming bodily tissues. That is, the material should have such combinations of mechanical properties as to allow the device to bend and flex through fluid pathways of the body without causing damage.

While thermoplastic polyurethanes have many mechanical properties which make them attractive for fabrication of medical devices, it is known that TPU compositions having aromatic or cyclic aliphatic isocyanates in the hard segment often exhibit softening when subjected to the aqueous environment found in the body, and thus have not been good candidates for certain applications that require the maintenance of sufficient hardness, flexibility and maneuverability in these environments. Thus, COPA and/or PEBA materials have often been used over TPU for such applications.

There is an ongoing need for TPU compositions that can deliver high rigidity, elasticity, rebound resilience and flexibility, or any combination thereof, in bodily environments.

SUMMARY

This technology relates to thermoplastic polyurethane (TPU) compositions that demonstrates good mechanical properties, such as flexibility, maneuverability, and rigidity, at least comparable to polyether block amide (PEBA) materials and copolyamide (COPA) materials.

The disclosed technology provides a thermoplastic polyurethane (TPU) composition that includes the reaction product of a polyisocyanate component including at least a first and a second linear aliphatic diisocyanate; a polyol component including at least one polyether polyol; and a chain extender component including at least one diol chain extender of the general formula HO—$(CH_2)_x$—OH wherein x is an integer from 2 to about 6, and wherein the ratio of the first aliphatic diisocyanate to the second aliphatic diisocyanate is from 1:1 to 20:1.

The disclosed technology further provides TPU composition described herein in which the reaction product is a thermoplastic polyurethane having one or more of the following properties: i) a Shore D hardness, as measured by ASTM D2240, from 20 to 75; ii) a wet flexural modulus, as measured by ASTM D790, from 3,000 to 55,000; iii) an elongation at break, as measured by ASTM D412 from 250 to 1000 percent; iv) a rebound recovery as measured by ASTM D2632 of from 40 percent to 50 percent; v) a tensile strength, as measured by ASTM D412, of from 3,000 to 10,000; and a creep recovery as measured by ASTM D2990-01 of from 40 percent to 80 percent.

The disclosed technology further provides the TPU composition described herein in which the reaction product is a thermoplastic polyurethane having a Shore D hardness, as measured by ASTM D2240, from 20 to 75.

The disclosed technology further provides the TPU composition described herein in which the first and second aliphatic diisocyanate components include 1,6-hexanediisocyanate and H12MDI.

The disclosed technology further provides the TPU composition described herein in which the polyether polyol has a number average molecular weight from 500 to 3,000.

The disclosed technology further provides the TPU composition described herein in which the polyether polyol has a number average molecular weight at least 500.

The disclosed technology further provides the TPU composition described herein in which the polyether polyol comprises poly(tetramethylene oxide) (PTMO).

The disclosed technology further provides the TPU composition described herein in which the chain extender component includes 1, 4-butanediol.

The disclosed technology further provides the TPU composition described herein in which the molar ratio of the chain extender component to the polyol component is from 30:1 to 0.5 to 1.

The disclosed technology further provides the TPU composition described herein in which the chain extender component is present from 2 wt % to 30 wt % of the total weight of the composition.

The disclosed technology further provides the TPU composition described herein in which the polyisocyanate component further includes MDI, TDI, IPDI, LDI, BDI, PDI, CHDI, TODI, NDI, HXDI or any combination thereof.

The disclosed technology further provides the TPU composition described herein in which the polyol component further includes a polyester polyol, a polycarbonate polyol, a polysiloxane polyol, a polyamide oligomer polyol, or any combinations thereof.

The disclosed technology further provides the TPU composition described herein in which the chain extender component further includes one or more additional diol chain extenders, diamine chain extenders, or a combination thereof.

The disclosed technology further provides the TPU composition described herein in which the TPU composition further includes one or more additional additives selected from the group consisting of pigments, UV stabilizers, UV absorbers, antioxidants, lubricity agents, heat stabilizers, hydrolysis stabilizers, cross-linking activators, flame retardants, layered silicates, fillers, colorants, reinforcing agents, adhesion mediators, impact strength modifiers, and antimicrobials.

The disclosed technology further provides a thermoplastic polyurethane composition in which the ratio of the first aliphatic diisocyanate to the second aliphatic diisocyanate is from 1:1 to 19:1.

The disclosed technology further provides a thermoplastic polyurethane composition in which the ratio of the first aliphatic diisocyanate to the second aliphatic diisocyanate is from 1:1 to 9:1.

The disclosed technology further provides an article made from the TPU composition described herein.

The article made from the TPU composition described herein includes one or more of a pacemaker head, an angiography catheter, an angioplasty catheter, an epidural catheter, a thermal dilution catheter, a urology catheter, a catheter connector, medical tubing, a cartilage replacement, a hair replacement or a joint replacement.

The disclosed technology further provides a process of making a thermoplastic polyurethane composition as disclosed herein, the process comprising the steps of: (I) reacting a) a polyisocyanate component comprising at least a first linear aliphatic diisocyanate and a second aliphatic diisocyanate in a ratio of from 1:1 to 20:1; b) a polyol component comprising at least one polyether polyol; and c) a chain extender component comprising at least one diol chain extender of the general formula HO—$(CH_2)_x$—OH wherein x is an integer from 2 to about 6.

The disclosed technology further provides a process further including the step of: (II) mixing the thermoplastic polyurethane composition of step (I) with one or more additional additives selected from the group consisting of pigments, UV stabilizers, UV absorbers, antioxidants, lubricity agents, heat stabilizers, hydrolysis stabilizers, cross-linking activators, flame retardants, layered silicates, fillers, colorants, reinforcing agents, adhesion mediators, impact strength modifiers, and antimicrobials.

The disclosed technology further provides a thermoplastic polyurethane composition including a) a polyisocyanate component comprising a first linear aliphatic diisocyate and a second aliphatic diisocyanate in a ratio of first linear aliphatic diisocyanate to second aliphatic diisocyanate from 1:1 to 20:1; b) a polyol component comprising at least one polyether polyol; and c) a chain extender component comprising at least one diol chain extender of the general formula HO—$(CH_2)_x$—OH wherein x is an integer from 2 to about 6; wherein the resulting thermoplastic polyurethane composition has a similar or an improved wet flexural modulus as measured by ASTM D790 relative to a copolyamide polymer or a polyether block amide material.

DETAILED DESCRIPTION

Various preferred features and embodiments will be described below by way of non-limiting illustration.

The disclosed technology provides a thermoplastic polyurethane (TPU) composition that includes the reaction product of: a) a polyisocyanate component that includes at least a first and a second linear aliphatic diisocyanate; b) a polyol component that includes at least one polyether polyol; and c) a chain extender component that includes at least one diol chain extender of the general formula HO—$(CH_2)_x$—OH wherein x is an integer from 2 to 6.

The Polyisocyanate

The TPU compositions described herein are made using: (a) a polyisocyanate component, which includes at least a first and a second linear aliphatic diisocyanate.

In some embodiments, the linear aliphatic diisocyanates may include 1,6-hexanediisocyanate (HDI), bis(isocyanatomethyl)cyclohexane (HXDI), and dicyclohexylmethane-4,4'-diisocyanate (H12MDI), and combinations thereof. In some embodiments, the polyisocyanate component comprises 1,6-hexanediisocyanate. In some embodiments, the polyisocyanate component comprises HXDI.

In some embodiments, the polyisocyanate component may include one or more additional polyisocyanates, which are typically diisocyanates.

Suitable polyisocyanates which may be used in combination with the linear aliphatic diisocyanates described above may include linear or branched aromatic diisocyanates, branched aliphatic diisocyanates, or combinations thereof. In some embodiments, the polyisocyanate component includes one or more aromatic diisocyanates. In other embodiments, the polyisocyanate component is essentially free of, or even completely free of, aromatic diisocyanates.

These additional polyisocyanates may include 4,4'-methylenebis(phenyl isocyanate) (MDI), toluene diisocyanate (TDI), isophorone diisocyanate (IPDI), lysine diisocyanate (LDI), 1,4-butane diisocyanate (BDI), 1,4-phenylene diisocyanate (PDI), 1,4-cyclohexyl diisocyanate (CHDI), 3,3'-dimethyl-4,4'-biphenylene diisocyanate (TODI), 1,5-naphthalene diisocyanate (NDI), bis(isocyanatomethyl) cyclohexane, or any combination thereof.

In some embodiments, the described TPU is prepared with a polyisocyanate component that includes HDI and H12MDI. In some embodiments, the TPU is prepared with a polyisocyanate component that consists essentially of HDI and H12MDI. In some embodiments, the TPU is prepared with a polyisocyanate component that consists of HDI and H12MDI. In some embodiments, the polyisocyanate includes, or consists of, or even consists essentially of HXDI.

In some embodiments, the thermoplastic polyurethane is prepared with a polyisocyanate component that includes (or consists essentially of, or even consists of) HDI, HXDI, H12MDI and at least one of MDI, TDI, IPDI, LDI, BDI, PDI, CHDI, TODI, and NDI.

In still other embodiments, the polyisocyanate component is essentially free of (or even completely free of) any non-linear aliphatic diisocyanates, any aromatic diisocyanates, or both. In still other embodiments, the polyisocyanate component is essentially free of (or even completely free of) any polyisocyanate other than the linear aliphatic diisocyanates described above. In some embodiments, the first linear aliphatic diisocyanate is HDI and the second aliphatic diisocyanate is H12MDI.

The weight ratio of the first linear aliphatic diisocyanate to the second aliphatic diisocyanate is, in one embodiment, from 1:1 to 20:1, and in a further embodiment from 1:1 to 19:1, or even from 1:1 to 9:1. The weight ratio of first to second diisocyanate will be dependent on the desired hardness of the TPU, with lower Shore D values having a higher ratio of the first linear diisocyanate to the second diisocyanate, and higher Shore D values have a lower ratio of the first linear diisocyanate to the second diisocyanate.

The Polyol Component

The TPU compositions described herein are made using: (b) a polyol component comprising at least one polyether polyol.

The invention further provides for the TPU compositions described herein wherein the polyether polyol has a number average molecular weight from 500 to 1,000 or 500 to 3,000, or 600 to 1,000, or 650 to 1,000 or 1,000 to 3,000, or even from 500, or 600, or 6540, or 1,500 to 2,500, or even about 2,000.

The invention further provides for the TPU compositions described herein wherein the polyol component that further includes a polyester polyol, a polycarbonate polyol, a polysiloxane polyol, or any combinations thereof.

In other embodiments, the polyol component is essentially free of (or even completely free of) any polyester polyols, polycarbonate polyols, polysiloxane polyols, or all of the above. In still other embodiments, the polyol component is essentially free of (or even completely free of) any polyol other than the linear polyether polyol described above, which in some embodiments is poly(tetramethylene oxide) (PTMO) which may also be described as the reaction product of water and tetrahydrofuran.

Suitable polyether polyols may also be referred to as hydroxyl terminated polyether intermediates, and include polyether polyols derived from a diol or polyol having a total of from 2 to 15 carbon atoms. In some embodiments, the diol or polyol is reacted with an ether comprising an alkylene oxide having from 2 to 6 carbon atoms, typically ethylene oxide or propylene oxide or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) (PEG) comprising ethylene oxide reacted with ethylene glycol, polypropylene glycol) comprising propylene oxide reacted with propylene glycol, poly(tetramethylene glycol) comprising water reacted with tetrahydrofuran (PTMEG). In some embodiments, the polyether intermediate includes PTMEG or PEG or combinations thereof. Suitable polyether polyols also include polyamide adducts of an alkylene oxide and can include, for example, ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the technology described herein. Typical copolyethers include the reaction product of THF and ethylene oxide or THF and propylene oxide. These are available from BASF as Poly-THF®-B, a block copolymer, and poly-THF®-R, a random copolymer. The various polyether intermediates generally have a number average molecular weight (Mn) as determined by assay of the terminal functional groups which is an average molecular weight greater than about 700, or even from 700, 1,000, 1,500 or even 2,000 up to 10,000, 5,000, 3,000, 2,500, 2,000 or even 1,000. In some embodiments, the polyether intermediate includes a blend of two or more different molecular weight polyethers, such as a blend of 2,000 Mn PTMO and 1,000 Mn PTMO.

In some embodiments, the polyol component used to prepare the TPU composition described above can include one or more additional polyols. Examples of suitable additional polyols include a polycarbonate polyol, polysiloxane polyol, polyester polyols including polycaprolactone polyester polyols, polyamide oligomers including telechelic polyamide polyols, or any combinations thereof. In other embodiments, the polyol component used to prepare the TPU is free of one or more of these additional polyols, and in some embodiments the polyol component consists essentially of the polyether polyol described above. In some embodiments the polyol component consists of the polyether polyol described above. In other embodiments, the polyol component used to prepare the TPU is free of polyester polyols, polycarbonate polyols, polysiloxane polyols, polyamide oligomers including telechelic polyamide polyols, or even all of the above.

When present, these optional additional polyols may also be described as hydroxyl terminated intermediates. When present, they may include one or more hydroxyl terminated polyesters, one or more hydroxyl terminated polycarbonates, one or more hydroxyl terminated polysiloxanes, or mixtures thereof.

Suitable hydroxyl terminated polyester intermediates include linear polyesters having a number average molecular weight (Mn) of from about 500 to about 10,000, from about 700 to about 5,000, or from about 700 to about 4,000, and generally have an acid number generally less than 1.3 or less than 0.5. The molecular weight is determined by assay of the terminal functional groups and is related to the number average molecular weight. The polyester intermediates may be produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. The dicarboxylic acids of the desired polyester can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is often a preferred acid. The glycols which are reacted to form a desirable polyester intermediate can be aliphatic, aromatic, or combinations thereof, including any of the glycol described above in the chain extender section, and have a total of from 2 to 20 or from 2 to 12 carbon atoms. Suitable examples include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and mixtures thereof.

Suitable hydroxyl terminated polycarbonates include those prepared by reacting a glycol with a carbonate. U.S. Pat. No. 4,131,731 is hereby incorporated by reference for its disclosure of hydroxyl terminated polycarbonates and their preparation. Such polycarbonates are linear and have terminal hydroxyl groups with essential exclusion of other terminal groups. The essential reactants are glycols and carbonates. Suitable glycols are selected from cycloaliphatic and aliphatic diols containing 4 to 40, and or even 4 to 12 carbon atoms, and from polyoxyalkylene glycols containing 2 to 20 alkoxy groups per molecular with each alkoxy group containing 2 to 4 carbon atoms. Suitable diols include aliphatic diols containing 4 to 12 carbon atoms such as 1,4-butanediol, 1,5-pentanediol, neopentyl glycol, 1,6-hexanediol, 1,6-2,2,4-trimethylhexanediol, 1,10-decanediol, hydrogenated dilinoleylglycol, hydrogenated dioleylglycol; and cycloaliphatic diols such as 1,3-cyclohexanediol, 1,4-dimethylolcyclohexane, 1,4-cyclohexanediol, 1,3-dimethylolcyclohexane, 1,4-endo methylene-2-hydroxy-5-hydroxymethyl cyclohexane, and polyalkylene glycols. The diols used in the reaction may be a single diol or a mixture of diols depending on the properties desired in the finished product. Polycarbonate intermediates which are hydroxyl terminated are generally those known to the art and in the literature. Suitable carbonates are selected from alkylene carbonates composed of a 5 to 7 member ring. Suitable carbonates for use herein include ethylene carbonate, trimethylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate, and 2,4-pentylene carbonate. Also, suitable herein are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either alkyl or aryl. On the other hand, if one group is aryl, the other can be alkyl or cycloaliphatic. Examples of suitable diarylcarbonates, which can contain 6 to 20 carbon atoms in each aryl group, are diphenylcarbonate, ditolylcarbonate, and dinaphthylcarbonate.

Suitable polysiloxane polyols include alpha-omega-hydroxyl or amine or carboxylic acid or thiol or epoxy terminated polysiloxanes. Examples include poly(dimethysiloxane) terminated with a hydroxyl or amine or carboxylic acid or thiol or epoxy group. In some embodiments, the polysiloxane polyols are hydroxyl terminated polysiloxanes. In some embodiments, the polysiloxane polyols have a number-average molecular weight in the range from 300 to 5,000, or from 400 to 3,000.

Polysiloxane polyols may be obtained by the dehydrogenation reaction between a polysiloxane hydride and an aliphatic polyhydric alcohol or polyoxyalkylene alcohol to introduce the alcoholic hydroxy groups onto the polysiloxane backbone. Suitable examples include alpha-omega-hydroxypropyl terminated poly(dimethysiloxane) and alpha-omega-amino propyl terminated poly(dimethysiloxane), both of which are commercially available materials. Further examples include copolymers of the poly(dimethysiloxane) materials with a poly(alkylene oxide).

The polyester polyols described above include polyester diols derived from caprolactone monomers. These polycaprolactone polyester polyols are terminated by primary hydroxyl groups. Suitable polycaprolactone polyester polyols may be made from ε-caprolactone and a bifunctional initiator such as diethylene glycol, 1,4-butanediol, or any of the other glycol and/or diol listed herein. In some embodiments, the polycaprolactone polyester polyols are linear polyester diols derived from caprolactone monomers.

Useful examples include CAPA™ 2202A, a 2,000 number average molecular weight (Mn) linear polyester diol, and CAPA™ 2302A, a 3,000 Mn linear polyester diol, both of which are commercially available from Perstorp Polyols Inc. These materials may also be described as polymers of 2-oxepanone and 1,4-butanediol.

The polycaprolactone polyester polyols may be prepared from 2-oxepanone and a diol, where the diol may be 1,4-butanediol, diethylene glycol, monoethylene glycol, hexane diol, 2,2-dimethyl-1,3-propanediol, or any combination thereof. In some embodiments, the diol used to prepare the polycaprolactone polyester polyol is linear. In some embodiments, the polycaprolactone polyester polyol is prepared from 1,4-butanediol.

In some embodiments, the polycaprolactone polyester polyol has a number average molecular weight from 2,000 to 3,000.

Suitable polyamide oligomers, including telechelic polyamide polyols, are not overly limited and include low molecular weight polyamide oligomers and telechelic polyamides (including copolymers) that include N-alkylated amide groups in the backbone structure. Telechelic polymers are macromolecules that contain two reactive end groups. Amine terminated polyamide oligomers can be useful as polyols in the disclosed technology. The term polyamide oligomer refers to an oligomer with two or more amide linkages, or sometimes the amount of amide linkages will be specified. A subset of polyamide oligomers are telechelic polyamides. Telechelic polyamides are polyamide oligomers with high percentages, or specified percentages, of two functional groups of a single chemical type, e.g. two terminal amine groups (meaning either primary, secondary, or mixtures), two terminal carboxyl groups, two terminal hydroxyl groups (again meaning primary, secondary, or mixtures), or two terminal isocyanate groups (meaning aliphatic, aromatic, or mixtures). Ranges for the percent difunctional that can meet the definition of telechelic include at least 70, 80, 90 or 95 mole % of the oligomers being difunctional as opposed to higher or lower functionality. Reactive amine terminated telechelic polyamides are telechelic polyamide oligomers where the terminal groups are both amine types, either primary or secondary and mixtures thereof, i.e. excluding tertiary amine groups.

In one embodiment, the telechelic oligomer or telechelic polyamide will have a viscosity measured by a Brookfield circular disc viscometer with the circular disc spinning at 5 rpm of less than 100,000 cps at a temperature of 70° C., less than 15,000 or 10,000 cps at 70° C., less than 100,000 cps at 60 or 50° C., less than 15,000 or 10,000 cps at 60° C.; or less that 15,000 or 10,000 cps at 50° C. These viscosities are those of neat telechelic prepolymers or polyamide oligomers without solvent or plasticizers. In some embodiments, the telechelic polyamide can be diluted with solvent to achieve viscosities in these ranges.

In some embodiments, the polyamide oligomer is a species below 20,000 g/mole molecular weight, e.g., often below 10,000; 5,000; 2,500; or 2000 g/mole, that has two or more amide linkages per oligomer. The telechelic polyamide has molecular weight preferences identical to the polyamide oligomer. Multiple polyamide oligomers or telechelic polyamides can be linked with condensation reactions to form polymers, generally above 100,000 g/mole.

Generally, amide linkages are formed from the reaction of a carboxylic acid group with an amine group or the ring opening polymerization of a lactam, e.g., where an amide linkage in a ring structure is converted to an amide linkage in a polymer. In one embodiment, a large portion of the amine groups of the monomers are secondary amine groups or the nitrogen of the lactam is a tertiary amide group. Secondary amine groups form tertiary amide groups when the amine group reacts with carboxylic acid to form an amide. For the purposes of this disclosure, the carbonyl group of an amide, e.g., as in a lactam, will be considered as derived from a carboxylic acid group. The amide linkage of a lactam is formed from the reaction of carboxylic group of an aminocarboxylic acid with the amine group of the same aminocarboxylic acid. In one embodiment, we want less than 20, 10 or 5 mole percent of the monomers used in making the polyamide to have functionality in polymerization of amide linkages of 3 or more.

The polyamide oligomers and telechelic polyamides of this disclosure can contain small amounts of ester linkages, ether linkages, urethane linkages, urea linkages, etc. if the additional monomers used to form these linkages are useful to the intended use of the polymers.

As earlier indicated many amide forming monomers create on average one amide linkage per repeat unit. These include diacids and diamines when reacted with each other, aminocarboxylic acids, and lactams. These monomers, when reacted with other monomers in the same group, also create amide linkages at both ends of the repeat units formed. Thus, we will use both percentages of amide linkages and mole percent and weight percentages of repeat units from amide forming monomers. Amide forming monomers will be used to refer to monomers that form on average one amide linkage per repeat unit in normal amide forming condensation linking reactions.

In one embodiment, at least 10 mole percent, or at least 25, 45 or 50, and or even at least 60, 70, 80, 90, or 95 mole % of the total number of the heteroatom containing linkages connecting hydrocarbon type linkages are characterized as being amide linkages. Heteroatom linkages are linkages such as amide, ester, urethane, urea, ether linkages where a heteroatom connects two portions of an oligomer or polymer that are generally characterized as hydrocarbons (or having carbon to carbon bond, such as hydrocarbon linkages). As the amount of amide linkages in the polyamide increase the amount of repeat units from amide forming monomers in the polyamide increases. In one embodiment, at least 25 wt. %, or at least 30, 40, 50, or even at least 60, 70, 80, 90, or 95 wt. % of the polyamide oligomer or telechelic polyamide is repeat units from amide forming monomers, also identified as monomers that form amide linkages at both ends of the repeat unit. Such monomers include lactams, aminocarboxylic acids, dicarboxylic acid and diamines. In one embodiment, at least 50, 65, 75, 76, 80, 90, or 95 mole percent of the amide linkages in the polyamide oligomer or telechelic polyamine are tertiary amide linkages.

The percent of tertiary amide linkages of the total number of amide linkages was calculated with the following equation:

$$\text{Tertiary amide linkage \%} = \frac{\sum_{i=1}^{n}(w_{tertN,i} \times n_i)}{\sum_{i=1}^{n}(w_{totalN,i} \times n_i)} \times 100$$

where: n is the number of monomers; the index i refers to a certain monomer; $w_{tertN}$ is the average number nitrogen atoms in a monomer that form or are part of tertiary amide linkages in the polymerizations, (note: end-group forming amines do not form amide groups during the polymerizations and their amounts are excluded from $w_{tertN}$); $w_{totalN}$ is the average number nitrogen atoms in a monomer that form or are part of tertiary amide linkages in the polymerizations (note: the end-group forming amines do not form amide groups during the polymerizations and their amounts are excluded from $w_{totalN}$); and $n_i$ is the number of moles of the monomer with the index i.

The percent of amide linkages of the total number of all heteroatom containing linkages (connecting hydrocarbon linkages) was calculated by the following equation:

$$\text{Amide linkage \%} = \frac{\sum_{i=1}^{n}(w_{totalN,i} \times n_i)}{\sum_{i=1}^{n}(w_{totalS,i} \times n_i)} \times 100$$

where: $w_{totalS}$ is the sum of the average number of heteroatom containing linkages (connecting hydrocarbon linkages) in a monomer and the number of heteroatom containing linkages (connecting hydrocarbon linkages) forming from that monomer by the reaction with a carboxylic acid bearing monomer during the polyamide polymerizations; and all other variables are as defined above. The term "hydrocarbon linkages" as used herein are just the hydrocarbon portion of each repeat unit formed from continuous carbon to carbon bonds (i.e. without heteroatoms such as nitrogen or oxygen) in a repeat unit. This hydrocarbon portion would be the ethylene or propylene portion of ethylene oxide or propylene oxide; the undecyl group of dodecyllactam, the ethylene group of ethylenediamine, and the $(CH_2)_4$ (or butylene) group of adipic acid.

In some embodiments, the amide or tertiary amide forming monomers include dicarboxylic acids, diamines, aminocarboxylic acids and lactams. Suitable dicarboxylic acids are where the alkylene portion of the dicarboxylic acid is a cyclic, linear, or branched (optionally including aromatic groups) alkylene of 2 to 36 carbon atoms, optionally including up to 1 heteroatom per 3 or 10 carbon atoms of the diacid, more preferably from 4 to 36 carbon atoms (the diacid would include 2 more carbon atoms than the alkylene portion). These include dimer fatty acids, hydrogenated dimer acid, sebacic acid, etc.

Suitable diamines include those with up to 60 carbon atoms, optionally including one heteroatom (besides the two nitrogen atoms) for each 3 or 10 carbon atoms of the diamine and optionally including a variety of cyclic, aromatic or heterocyclic groups providing that one or both of the amine groups are secondary amines.

Such diamines include Ethacure™ 90 from Albermarle (supposedly a N,N'-bis(1,2,2-trimethylpropyl)-1,6-hexanediamine); Clearlink™ 1000 from Dorfketal, or Jefflink™ 754 from Huntsman; N-methylaminoethanol; dihydroxy terminated, hydroxyl and amine terminated or diamine terminated poly(alkyleneoxide) where the alkylene has from 2 to 4 carbon atoms and having molecular weights from about 40 or 100 to 2000; N,N'-diisopropyl-1,6-hexanediamine; N,N'-di(sec-butyl)phenylenediamine; piperazine; homopiperazine; and methyl-piperazine.

Suitable lactams include straight chain or branched alkylene segments therein of 4 to 12 carbon atoms such that the ring structure without substituents on the nitrogen of the lactam has 5 to 13 carbon atoms total (when one includes the carbonyl) and the substituent on the nitrogen of the lactam (if the lactam is a tertiary amide) is an alkyl group of from 1 to 8 carbon atoms and more desirably an alkyl group of 1 to 4 carbon atoms. Dodecyl lactam, alkyl substituted dodecyl lactam, caprolactam, alkyl substituted caprolactam, and other lactams with larger alkylene groups are preferred lactams as they provide repeat units with lower Tg values. Aminocarboxylic acids have the same number of carbon atoms as the lactams. In some embodiments, the number of carbon atoms in the linear or branched alkylene group between the amine and carboxylic acid group of the aminocarboxylic acid is from 4 to 12 and the substituent on the nitrogen of the amine group (if it is a secondary amine group) is an alkyl group with from 1 to 8 carbon atoms, or from 1 or 2 to 4 carbon atoms.

In one embodiment, desirably at least 50 wt. %, or at least 60, 70, 80 or 90 wt. % of said polyamide oligomer or telechelic polyamide comprise repeat units from diacids and diamines of the structure of the repeat unit being:

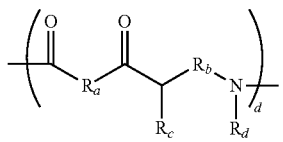

wherein: $R_a$ is the alkylene portion of the dicarboxylic acid and is a cyclic, linear, or branched (optionally including aromatic groups) alkylene of 2 to 36 carbon atoms, optionally including up to 1 heteroatom per 3 or 10 carbon atoms of the diacid, more preferably from 4 to 36 carbon atoms (the diacid would include 2 more carbon atoms than the alkylene portion); and $R_b$ is a direct bond or a linear or branched (optionally being or including cyclic, heterocyclic, or aromatic portion(s)) alkylene group (optionally containing up to 1 or 3 heteroatoms per 10 carbon atoms) of 2 to 36 or 60 carbon atoms and more preferably 2 or 4 to 12 carbon atoms and $R_c$ and $R_d$ are individually a linear or branched alkyl group of 1 to 8 carbon atoms, more preferably 1 or 2 to 4 carbon atoms or $R_c$ and $R_d$ connect together to form a single linear or branched alkylene group of 1 to 8 carbon atoms or optionally with one of $R_c$ and $R_d$ is connected to $R_b$ at a carbon atom, more desirably $R_c$ and $R_d$ being an alkyl group of 1 or 2 to 4 carbon atoms.

In one embodiment, desirably at least 50 wt. %, or at least 60, 70, 80 or 90 wt. % of said polyamide oligomer or telechelic polyamide comprise repeat units from lactams or amino carboxylic acids of the structure:

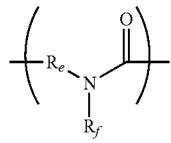

Repeat units can be in a variety of orientations in the oligomer derived from lactams or amino carboxylic acid depending on initiator type, wherein each $R_e$ independently is linear or branched alkylene of 4 to 12 carbon atoms and each $R_f$ independently is a linear or branched alkyl of 1 to 8, more desirably 1 or 2 to 4, carbon atoms.

In some embodiments, the telechelic polyamide polyols include those having (i) repeat units derived from polymerizing monomers connected by linkages between the repeat units and functional end groups selected from carboxyl or primary or secondary amine, wherein at least 70 mole percent of telechelic polyamide have exactly two functional end groups of the same functional type selected from the group consisting of amino or carboxylic end groups; (ii) a polyamide segment comprising at least two amide linkages characterized as being derived from reacting an amine with a carboxyl group, and said polyamide segment comprising repeat units derived from polymerizing two or more of monomers selected from lactams, aminocarboxylic acids, dicarboxylic acids, and diamines; (iii) wherein at least 10 percent of the total number of the heteroatom containing linkages connecting hydrocarbon type linkages are characterized as being amide linkages; and (iv) wherein at least 25 percent of the amide linkages are characterized as being tertiary amide linkages.

In some embodiments, the polyol component used to prepare the TPU further includes (or consists essentially of, or even consists of) a polyether polyol and one or more additional polyols selected from the group consisting of a polyester polyol, polycarbonate polyol, polysiloxane polyol, or any combinations thereof.

In some embodiments, the thermoplastic polyurethane is prepared with a polyol component that consists essentially of polyether polyol. In some embodiments, the thermoplastic polyurethane is prepared with a polyol component that consists of polyether polyol, and in some embodiments PTMO.

The Chain Extender

The TPU compositions described herein are made using: (c) a chain extender component that includes at least one diol chain extender of the general formula HO—$(CH_2)_x$—OH wherein x is an integer from 2 to 6 or even from 4 to 6. In other embodiments, x is the integer 4.

Useful diol chain extenders include relatively small polyhydroxy compounds, for example lower aliphatic or short chain glycols having from 2 to 20, or 2 to 12, or 2 to 10 carbon atoms. Suitable examples include ethylene glycol, diethylene glycol, propylene glycol, dipropylene glycol, 1,4-butanediol (BDO), 1,6-hexanediol (HDO), 1,3-butanediol, 1,5-pentanediol, neopentylglycol, 1,4-cyclohexanedimethanol (CHDM), 2,2-bis[4-(2-hydroxyethoxy)phenyl] propane (HEPP), heptanediol, nonanediol, dodecanediol, ethylenediamine, butanediamine, hexamethylenediamine, and hydroxyethyl resorcinol (HER), and the like, as well as mixtures thereof. In some embodiments, the chain extender includes BDO, HDO, or a combination thereof. In some embodiments, the chain extender includes BDO. Other glycols, such as aromatic glycols could be used, but in some embodiments the TPUs described herein are essentially free of or even completely free of such materials, or a combination thereof.

In some embodiments, the chain extender component may further include one or more additional chain extenders. These additional chain extenders are not overly limited and may include diols (other than those described above), diamines, and combinations thereof.

In some embodiments, the additional chain extender includes a cyclic chain extender. Suitable examples include CHDM, HEPP, HER, and combinations thereof. In some embodiments, the additional chain extender includes an aromatic cyclic chain extender, for example HEPP, HER, or a combination thereof. In some embodiments, the additional chain extender includes an aliphatic cyclic chain extender, for example CHDM. In some embodiments, the additional chain extender is substantially free of, or even completely free of aromatic chain extenders, for example aromatic cyclic chain extenders. In some embodiments, the additional chain extender is substantially free of, or even completely free of polysiloxanes.

In some embodiments, the chain extender component includes 1,9-nonanediol, 1,10-decanediol, 1,11-undecanediol, 1,12-dodecanediol, or a combination thereof. In some embodiments, the chain extender component includes 1,10-decanediol, 1,11-undecanediol, 1,12-dodecanediol, or a combination thereof. In some embodiments, the chain extender component includes 1,12-dodecanediol.

The Thermoplastic Polyurethane Compositions

The compositions described herein are TPU compositions. These TPU are prepared by reacting: a) the polyisocyanate component described above, that includes a first and a second linear aliphatic diisocyanate; b) the polyol component described above, that includes a polyether polyol; and c) the chain extender component that includes at least one diol chain extender of the general formula HO—$(CH_2)_x$—OH wherein x is an integer from 2 to about 6 or even 2 to 4, as described above.

The resulting TPU has: i) a Shore D hardness, as measured by ASTM D2240, from 20 to 80 or even 20 to 75, or even from 20 to 70; ii) a rebound recovery as measured by ASTM D2632, from 30 to 60, or even from 40 to 50; iii) a creep recovery as measured by ASTM D2990-01 of from 30 to 90, or from 40 to 80; iv) a tensile strength as measured by ASTM D412 of from 4,000 psi to 10,000 psi; a wet flexural modulus as measured by ASTM D790 of from about 3,000 to about 55,000; and vi) an elongation at break as measured by ASTM D412 of from 250 percent to 1000 percent.

In some embodiments, the TPU compositions of the invention have a hard segment content of 15 to 85 percent by weight, where the hard segment content is the portion of the TPU derived from the polyisocyanate component and the chain extender component (the hard segment content of the TPU may be calculated by adding the weight percent content of chain extender and polyisocyanate in the TPU and dividing that total by the sum of the weight percent contents of the chain extender, polyisocyanate, and polyol in the TPU). In other embodiments, the hard segment content is from 5 to 95, or from 10 to 90, or from 15 to 85 percent by weight. The remainder of the TPU is derived from the polyol component, which may be present from 10 to 90 percent by weight, or even from 15 to 85 percent by weight.

In some embodiments, the molar ratio of the chain extender to the polyol of the TPU is not limited so long as the hardness and snap back requirements are met. In some embodiments, the molar ratio of the chain extender to the polyol of the TPU (chain extender:polyol) is from 30:1 to 0.5:1, or from 21:1 to 0.7:1.

The described compositions include the TPU materials described above and also TPU compositions that include such TPU materials and one or more additional components. These additional components include other polymeric materials that may be blended with the TPU described herein. These additional components also include one or more additives that may be added to the TPU, or blend containing the TPU, to impact the properties of the composition.

The TPU described herein may also be blended with one or more other polymers. The polymers with which the TPU described herein may be blended are not overly limited. In some embodiments, the described compositions include a two or more of the described TPU materials. In some embodiments, the compositions include at least one of the described TPU materials and at least one other polymer, which is not one of the described TPU materials. In some embodiments, the described blends will have the same combination of properties described above for the TPU composition. In other embodiments, the TPU composition will of course have the described combination of properties, while the blend of the TPU composition with one or more of the other polymeric materials described above may or may not.

Polymers that may be used in combination with the TPU materials described herein also include more conventional TPU materials such as non-caprolactone polyester-based TPU, polyether-based TPU, or TPU containing both non-caprolactone polyester and polyether groups. Other suitable materials that may be blended with the TPU materials described herein include polycarbonates, polyolefins, styrenic polymers, acrylic polymers, polyoxymethylene polymers, polyamides, polyphenylene oxides, polyphenylene sulfides, polyvinylchlorides, chlorinated polyvinylchlorides, polylactic acids, or combinations thereof.

Polymers for use in the blends described herein include homopolymers and copolymers. Suitable examples include: (i) a polyolefin (PO), such as polyethylene (PE), polypropylene (PP), polybutene, ethylene propylene rubber (EPR), polyoxyethylene (POE), cyclic olefin copolymer (COC), or combinations thereof; (ii) a styrenic, such as polystyrene (PS), acrylonitrile butadiene styrene (ABS), styrene acrylonitrile (SAN), styrene butadiene rubber (SBR or HIPS), polyalphamethylstyrene, styrene maleic anhydride (SMA), styrene-butadiene copolymer (SBC) (such as styrene-butadiene-styrene copolymer (SBS) and styrene-ethylene/butadiene-styrene copolymer (SEBS)), styrene-ethylene/propylene-styrene copolymer (SEPS), styrene butadiene latex (SBL), SAN modified with ethylene propylene diene monomer (EPDM) and/or acrylic elastomers (for example, PS-SBR copolymers), or combinations thereof; (iii) a thermoplastic polyurethane (TPU) other than those described above; (iv) a polyamide, such as Nylon™, including polyamide 6,6 (PA66), polyamide 1,1 (PA11), polyamide 1,2 (PA12), a copolyamide (COPA), or combinations thereof; (v) an acrylic polymer, such as polymethyl acrylate, polymethylmethacrylate, a methyl methacrylate styrene (MS) copolymer, or combinations thereof; (vi) a polyvinylchloride (PVC), a chlorinated polyvinylchloride (CPVC), or combinations thereof; (vii) a polyoxyemethylene, such as polyacetal; (viii) a polyester, such as polyethylene terephthalate (PET), polybutylene terephthalate (PBT), copolyesters and/or polyester elastomers (COPE) including polyether-ester block copolymers such as glycol modified polyethylene terephthalate (PETG), polylactic acid (PLA), polyglycolic acid (PGA), copolymers of PLA and PGA, or combinations thereof; (ix) a polycarbonate (PC), a polyphenylene sulfide (PPS), a polyphenylene oxide (PPO), or combinations thereof; or combinations thereof.

In some embodiments, these blends include one or more additional polymeric materials selected from groups (i), (iii), (vii), (viii), or some combination thereof. In some embodiments, these blends include one or more additional polymeric materials selected from group (i). In some embodiments, these blends include one or more additional polymeric materials selected from group (iii). In some embodiments, these blends include one or more additional polymeric materials selected from group (vii). In some embodiments, these blends include one or more additional polymeric materials selected from group (viii).

The additional additives suitable for use in the TPU compositions described herein are not overly limited. Suitable additives include pigments, UV stabilizers, UV absorbers, antioxidants, lubricity agents, heat stabilizers, hydrolysis stabilizers, cross-linking activators, flame retardants, layered silicates, radio opacifiers, such as barium sulfate, tungsten metal, non-oxide bismuth salts, fillers, colorants, reinforcing agents, adhesion mediators, impact strength modifiers, antimicrobials, and any combination thereof.

In some embodiments, the additional component is a flame retardant. Suitable flame retardants are not overly limited and may include a boron phosphate flame retardant, a magnesium oxide, a dipentaerythritol, a polytetrafluoroethylene (PTFE) polymer, or any combination thereof. In some embodiments, this flame retardant may include a boron phosphate flame retardant, a magnesium oxide, a dipentaerythritol, or any combination thereof. A suitable example of a boron phosphate flame retardant is BUDIT®-326, commercially available from Budenheim USA, Inc. When present, the flame retardant component may be present in an amount from 0 to 10 weight percent of the overall TPU composition, in other embodiments from 0.5 to 10, or from 1 to 10, or from 0.5 or 1 to 5, or from 0.5 to 3, or even from 1 to 3 weight percent of the overall TPU composition.

The TPU compositions described herein may also include additional additives, which may be referred to as a stabilizer. The stabilizers may include antioxidants such as phenolics, phosphites, thioesters, and amines, light stabilizers such as hindered amine light stabilizers and benzothiazole UV absorbers, and other process stabilizers and combinations thereof. In one embodiment, the preferred stabilizer is Irganox®-1010 from BASF and Naugard®-445 from Chemtura. The stabilizer is used in the amount from about 0.1 weight percent to about 5 weight percent, in another embodiment from about 0.1 weight percent to about 3 weight percent, and in another embodiment from about 0.5 weight percent to about 1.5 weight percent of the TPU composition.

In addition, various conventional inorganic flame retardant components may be employed in the TPU composition. Suitable inorganic flame retardants include any of those known to one skilled in the art, such as metal oxides, metal oxide hydrates, metal carbonates, ammonium phosphate, ammonium polyphosphate, calcium carbonate, antimony oxide, clay, mineral clays including talc, kaolin, wollastonite, nanoclay, montmorillonite clay which is often referred to as nano-clay, and mixtures thereof. In one embodiment, the flame retardant package includes talc. The talc in the flame retardant package promotes properties of high limiting oxygen index (LOI). The inorganic flame retardants may be used in the amount from 0 to about 30 weight percent, from about 0.1 weight percent to about 20 weight percent, in another embodiment about 0.5 weight percent to about 15 weight percent of the total weight of the TPU composition.

Still further optional additives may be used in the TPU compositions described herein. The additives include colorants, antioxidants (including phenolics, phosphites, thioesters, and/or amines), antiozonants, stabilizers, inert fillers, lubricants, inhibitors, hydrolysis stabilizers, light stabilizers, hindered amines light stabilizers, benzotriazole UV absorber, heat stabilizers, stabilizers to prevent discoloration, dyes, pigments, inorganic and organic fillers, reinforcing agents and combinations thereof.

All of the additives described above may be used in an effective amount customary for these substances. The non-flame retardants additives may be used in amounts of from about 0 to about 30 weight percent, in one embodiment from about 0.1 to about 25 weight percent, and in another embodiment about 0.1 to about 20 weight percent of the total weight of the TPU composition.

These additional additives can be incorporated into the components of, or into the reaction mixture for, the preparation of the TPU resin, or after making the TPU resin. In another process, all the materials can be mixed with the TPU resin and then melted or they can be incorporated directly into the melt of the TPU resin.

The thermoplastic polyurethanes of the invention can be prepared by processes which are conventional in the art for the synthesis of polyurethane elastomers such as but not limited to a batch process or a one-shot technique. In the batch process, the components, i.e., the diisocyanate(s), the polyol(s), and the chain extenders (s), as well as the catalyst(s) and any other additive(s), if desired, are introduced into a container, mixed, dispensed into trays and allowed to cure. The cured TPU can then be granulated and pelletized. The one-shot procedure is performed in an extruder, e.g. single screw, twin screw, wherein the formative components, introduced individually or as a mixture into the extruder, and reacted at a temperature generally in one embodiment from about 100° C. to about 300° C., and in another embodiment from about 150° C. to about 250° C., and even from about 150° C. to about 240° C.

One or more polymerization catalysts may be present during the polymerization reaction. Generally, any conventional catalyst can be utilized to react the diisocyanate with the polyol intermediates or the chain extender. Examples of suitable catalysts which in particular accelerate the reaction between the NCO groups of the diisocyanates and the hydroxy groups of the polyols and chain extenders are the conventional tertiary amines known from the prior art, e.g. triethylamine, dimethylcyclohexylamine, N-methylmorpholine, N,N'-dimethylpiperazine, 2-(dimethylaminoethoxy) ethanol, diazabicyclo[2.2.2]octane and the like, and also in particular organometallic compounds, such as titanic esters, iron compounds, e.g. ferric acetylacetonate, tin compounds, e.g. stannous diacetate, stannous dioctoate, stannous dilaurate, or the dialkyltin salts of aliphatic carboxylic acids, e.g. dibutyltin diacetate, dibutyltin dilaurate, or the like. The amounts usually used of the catalysts are from 0.0001 to 0.1 part by weight per 100 parts by weight of polyhydroxy compound (b).

The polyurethanes generally have a hardness which ranges from about 20 Shore D to about 75 D.

The TPU materials described above may be prepared by a process that includes the step of (I) reacting: a) the polyisocyanate component described above, that includes at least one first and one second linear aliphatic diisocyanate; b) the polyol component described above, that includes at least one polyether polyol; and c) the chain extender component described above that include at least one diol chain extender of the general formula HO—$(CH_2)_x$—OH wherein x is an integer from 2 to about 6 or even 2 to 4, as described above.

The process may further include the step of: (II) mixing the TPU composition of step (I) with one or more blend components, including one or more additional TPU materials and/or polymers, including any of those described above.

The process may further include the step of: (II) mixing the TPU composition of step (I) with one or more additional additives selected from the group consisting of pigments, UV stabilizers, UV absorbers, antioxidants, lubricity agents, heat stabilizers, hydrolysis stabilizers, cross-linking activators, flame retardants, layered silicates, fillers, colorants, reinforcing agents, adhesion mediators, impact strength modifiers, and antimicrobials.

The process may further include the step of: (II) mixing the TPU composition of step (I) with one or more blend components, including one or more additional TPU materials and/or polymers, including any of those described above, and/or the step of: (III) mixing the TPU composition of step (I) with one or more additional additives selected from the group consisting of pigments, UV stabilizers, UV absorbers, antioxidants, lubricity agents, heat stabilizers, hydrolysis stabilizers, cross-linking activators, flame retardants, layered silicates, fillers, colorants, reinforcing agents, adhesion mediators, impact strength modifiers, and antimicrobials.

The TPU materials and/or compositions described herein may be used in the preparation of one or more articles. The specific type of articles that may be made from the TPU materials and/or compositions described herein are not overly limited.

The invention further provides an article made with the TPU materials and/or compositions described herein. Examples include but are not limited to medical applications, for example, where the TPU described herein may be used in pacemaker heads; angiography, angioplasty, epidural, thermal dilution, and urology catheters; catheter connectors; medical tubing; cartilage replacement, hair replacement, joint replacement, and the like, as well as used in, personal care applications, pharmaceutical applications, health care product applications, or any other number of applications. In some embodiments, these articles are prepared by extruding, injection molding, or any combination thereof.

The technology described herein also provides a method of improving the resilience (for example the recovery and/or snap back properties) of a TPU material and/or composition. The method involves using the first linear aliphatic diisocyate and the second aliphatic diisocyanate described above, the polyether polyol described above and the chain extender component described above which includes at least one diol chain extender of the general formula $HO-(CH_2)_x-OH$ wherein x is an integer from 2 to about 6, to prepare a TPU material, in place of or in combination with the polyol and chain extender of the original TPU, resulting in a TPU material and/or compositions with improved resilience (for example recovery and/or snap back properties).

The amount of each chemical component described is presented exclusive of any solvent which may be customarily present in the commercial material, that is, on an active chemical basis, unless otherwise indicated. However, unless otherwise indicated, each chemical or composition referred to herein should be interpreted as being a commercial grade material which may contain the isomers, by-products, derivatives, and other such materials which are normally understood to be present in the commercial grade.

It is known that some of the materials described above may interact in the final formulation, so that the components of the final formulation may be different from those that are initially added. For instance, metal ions (of, e.g., a flame retardant) can migrate to other acidic or anionic sites of other molecules. The products formed thereby, including the products formed upon employing the composition of the technology described herein in its intended use, may not be susceptible of easy description. Nevertheless, all such modifications and reaction products are included within the scope of the technology described herein; the technology described herein encompasses the composition prepared by admixing the components described above.

EXAMPLES

The technology described herein may be better understood with reference to the following non-limiting examples.

Example Set A

A series of examples with Shore D hardness, as measured by ASTM D2240, as set forth below are prepared to demonstrate the benefits of the invention. The formulations of the TPU examples are summarized in the tables below. Each of the examples is prepared by reacting the components and then forming a sample for testing by means of extrusion or molding.

TABLE 1

Formulations of Examples in Example Set A

| | Polyisocyanate[1] | Polyol[2] | Chain Extender[3] | Percent Hard Segment[4] |
|---|---|---|---|---|
| Comp Ex A-1[5] | N/A | N/A | N/A | N/A |
| Comp Ex A-2 | H12MDI | PTMO 2K | BDO | 25.4 |
| Comp Ex A-3 | MDI | PTMO 1K | BDO | 32.3 |
| Inv Ex A-4 | HDI/H12 MDI (19:1) | PTMO 2K | BDO | 15 |

[1]For the polyisocyanate: HDI is 1,6-hexanediisocyanate and H12MDI is 4,4'-Methylene dicyclohexyl diisocyanate.
[2]For the polyol: PTMO 2K is a 2,000 number average molecular weight polytetramethylene ether glycol polyether polyol
[3]For the chain extender: BDO is 1,4-butanediol.
[4]The Percent Hard Segment is calculated by adding the weight percent content of chain extender and polyisocyanate in the TPU and dividing that total by the sum of the weight percent contents of the chain extender, polyisocyanate and polyol in the TPU.
[5]Comparative Example A-1 is a commercially available polyether block amide marketed as PEBAX ® 2533 by Arkema, included for comparison.

Each sample is tested to verify its hardness (as measured by ASTM D5540), its mechanical properties (strength, modulus and elongation as measured by ASTM D412), creep recovery as measured by ASTM D2990-01 and its rebound resilience (as measured by ASTM D2632). Rebound resilience is an indication of hysteretic energy loss that can also be defined by the relationship between storage modulus and loss modulus. The percent rebound measured is inversely proportional to the hysteretic loss. Percentage resilience or rebound resilience is commonly used in quality control testing of polymers and compounding chemicals. Rebound resilience can be determined by a freely falling pendulum hammer and/or ball that is dropped from a given height that impacts a test specimen and imparts to it a certain amount of energy. A portion of that energy is returned by the specimen to the pendulum and may be measured by the extent to which the pendulum rebounds, whereby the restoring force is determined by gravity.

Creep recovery is a measure of a material's viscous and elastic properties. A constant load of 0.1 mPa is applied to the samples and removed after 60 minutes allowing the sample to recover. The recovered deformation after removal of the load over a period of 60 minutes compared to the maximum deformation is reported as % creep recovery.

Rebound resilience and creep recovery give an indication of the ability of a material to retain its mechanical properties over a short or long timescale, respectively. This is important for example, where torque transference must be maintained while guiding an angioplasty catheter.

TABLE 2

Test Results from Example Set A

| | Comp Ex A-1 | Comp Ex A-2 | Comp Ex A-3 | Inv Ex A-4 |
|---|---|---|---|---|
| Hardness | 27 | 23 | 25 | 22 |
| Dry Modulus (psi) | 2644 | 972 | 1767 | 3941 |
| Wet Modulus (psi) | 2009 | 834 | 1449 | 3414 |

TABLE 2-continued

Test Results from Example Set A

| | Comp Ex A-1 | Comp Ex A-2 | Comp Ex A-3 | Inv Ex A-4 |
|---|---|---|---|---|
| Elongation (at break) (%) | 971 | 724 | 583 | 904 |
| Rebound Resilience (%) | 45 | 51 | 44 | 47 |
| Creep Recovery (%) | 42.29 | 19.97 | 37.22 | 49.27 |

The results show the TPU compositions described herein provide at least comparable, if not superior combination of properties relative to the PEBAX® comparative examples and the non-inventive TPU examples, where all the samples have a similar hardness. In particular it is noted that Inventive Example A-4 has a wet flexural modulus, superior to the PEBAX® of Comparative Example A-1, while also having better rebound recovery (higher values denote better performance).

Example Set B

A second series of examples with Shore D hardness, as measured by ASTM D2240, of about 45 are prepared to demonstrate the benefits of the invention. The formulations of the TPU examples are summarized in the tables below. Each of the examples is prepared by reacting the components and then forming a sample for testing by means of extrusion or injection molding.

TABLE 3

Formulations of Examples in Example Set B

| | Polyisocyanate[1] | Polyol[2] | Chain Extender[3] | Percent Hard Segment[4] |
|---|---|---|---|---|
| Comp Ex B-1[5] | N/A | N/A | N/A | N/A |
| Comp Ex B-2 | H12MDI | PTMO 1K | BDO | 56.3 |
| Comp Ex B-3 | MDI | PTMO 1K | BDO | 50 |
| Inv Ex B-4 | HDI/H12 MDI (19:1) | PTMO 1K | BDO | 49 |

[1]For the polyisocyanate: HDI is 1,6-hexanediisocyanate and H12MDI is 4,4'-Methylene dicyclohexyl diisocyanate.
[2]For the polyol: PTMO 1K is a 1,000 number average molecular weight polytetramethylene ether glycol polyether polyol
[3]For the chain extender: BDO is 1,4-butanediol.
[4]The Percent Hard Segment is calculated by adding the weight percent content of chain extender and polyisocyanate in the TPU and dividing that total by the sum of the weight percent contents of the chain extender, polyisocyanate and polyol in the TPU.
[5]Comparative Example B-1 is a commercially available polyether block amide marketed as PEBAX ® 4033 by Arkema, included for comparison.

Each sample is tested using the same procedures described above.

TABLE 4

Test Results from Example Set B

| | Comp Ex B-1 | Comp Ex B-2 | Comp Ex B-3 | Inv Ex B-4 |
|---|---|---|---|---|
| Hardness | 42 | 45 | 45 | 44 |
| Dry Modulus (psi) | 12610 | 15568 | 8944 | 16247 |
| Wet Modulus (psi) | 10060 | 3421 | 5727 | 13168 |
| Elongation (at break) (%) | 794 | 413 | 419 | 661 |
| Rebound Resilience (%) | 39 | 31 | 30 | 48 |
| Creep Recovery | 52.85 | 48.68 | 49.74 | 59.72 |

The results show the TPU compositions described herein provides at least comparable, if not a superior combination of properties relative to the PEBAX® comparative examples and the non-inventive TPU examples, where all the samples have a similar hardness. In particular it is noted that Inventive Example B-4 has wet modulus, rebound recovery and creep recovery properties better than the PEBAX® of Comparative Example B-1 or any of the TPU of Comparative Examples, while still having acceptable elongation at break.

Example Set C

A third series of examples with a Shore D hardness, as measured by ASTM D2240, of about 65 are prepared to demonstrate the benefits of the invention. The formulations of the TPU examples are summarized in the tables below. Each of the examples is prepared by reacting the components and then forming a sample for testing by means of extrusion or injection molding.

TABLE 5

Formulations of Examples in Example Set C

| | Polyisocyanate[1] | Polyol[2] | Chain Extender[3] | Percent Hard Segment[4] |
|---|---|---|---|---|
| Comp Ex C-1[5] | N/A | N/A | N/A | N/A |
| Comp Ex C-2 | H12MDI | PTMO 1K | BDO | 69.4 |
| Comp Ex C-3 | MDI | PTMO 650/PTMO 1400 (3:1) | BDO | 65 |
| Inv Ex C-4 | HDI/H12 MDI (9:1) | PTMO 1K | BDO | 85 |

[1]For the polyisocyanate: HDI is 1,6-hexanediisocyanate and H12MDI is 4,4'-Methylene dicyclohexyl diisocyanate.
[2]For the polyol: PTMO 1K is a 1,000 number average molecular weight polytetramethylene ether glycol polyether polyol
[3]For the chain extender: BDO is 1,4-butanediol.
[4]The Percent Hard Segment is calculated by adding the weight percent content of chain extender and polyisocyanate in the TPU and dividing that total by the sum of the weight percent contents of the chain extender, polyisocyanate and polyol in the TPU.
[5]Comparative Example C-1 is a commercially available polyether block amide marketed as PEBAX ® 7233 by Arkema, included for comparison.

Each sample is tested using the same procedures described above.

TABLE 6

Test Results from Example Set C

| | Comp Ex C-1 | Comp Ex C-2 | Comp Ex C-3 | Inv Ex C-4 |
|---|---|---|---|---|
| Hardness | 67 | 67 | 74 | 67 |
| Dry Modulus (psi) | 109228 | 154701 | 142062 | 87825 |
| Wet Modulus (psi) | 57993 | 5820 | 16663 | 45652 |
| Elongation (at break) (%) | 486 | 307 | 315 | 286 |
| Rebound Resilience (%) | 37 | 30 | 35 | 46 |
| Creep Recovery | 62.37 | 95.2 | 86.59 | 77.29 |

The results show the TPU compositions described herein provide comparable combinations of properties relative to the PEBAX® comparative examples and the non-inventive TPU examples, where all the samples have a similar hardness.

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined.

Similarly, the ranges and amounts for each element of the technology described herein can be used together with ranges or amounts for any of the other elements.

As described hereinafter the molecular weight of the materials described above have been determined using known methods, such as GPC analysis using polystyrene standards. Methods for determining molecular weights of polymers are well known. The methods are described for instance: (i) P. J. Flory, "Principles of star polymer Chemistry", Cornell University Press 91953), Chapter VII, pp 266-315; or (ii) "Macromolecules, an Introduction to star polymer Science", F. A. Bovey and F. H. Winslow, Editors, Academic Press (1979), pp 296-312. As used herein the weight average and number weight average molecular weights of the materials described are obtained by integrating the area under the peak corresponding to the material of interest, excluding peaks associated with diluents, impurities, uncoupled star polymer chains and other additives.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the basic and novel characteristics of the composition or method under consideration. That is "consisting essentially of" permits the inclusion of substances that do not materially affect the basic and novel characteristics of the composition under consideration.

While certain representative embodiments and details have been shown for the purpose of illustrating the subject technology described herein, it will be apparent to those skilled in this art that various changes and modifications can be made therein without departing from the scope of the subject invention. In this regard, the scope of the technology described herein is to be limited only by the following claims.

What is claimed is:

1. A thermoplastic polyurethane composition comprising the reaction product of:
    a) a polyisocyanate component comprising at least a first linear aliphatic diisocyanate selected from 1,6-hexanediisocyanate (HDI) and a second aliphatic diisocyanate selected from bis(isocyanatomethyl)cyclohexane (HXDI) in a weight ratio of first linear aliphatic diisocyanate to the second aliphatic diisocyanate from 1:1 to 20:1;
    b) a polyol component comprising at least one polyether polyol, wherein said polyol component is free of polyester polyols; and
    c) a chain extender component comprising at least one diol chain extender of the general formula HO—$(CH_2)_x$—OH wherein x is an integer from 2 to about 6, 1,3-butanediol, 1,5-pentanediol, neopentylglycol, 1,4-cyclohexanedimethanol (CHDM), 2,2-bis[4-(2-hydroxyethoxy)phenyl]propane (HEPP), heptanediol, nonanediol, dodecanediol and combinations thereof.

2. The thermoplastic polyurethane composition of claim 1 wherein said reaction product is a thermoplastic polyurethane having one or more of the following properties:
    i) a Shore D hardness, as measured by ASTM D2240, from 20 to 75;
    ii) a wet flexural modulus, as measured by ASTM D790, from 3,000 to 55,000 psi;
    iii) an elongation at break, as measured by ASTM D412 from 250 to 1000 percent;
    iv) a rebound recovery as measured by ASTM D2632 of from 30 to 50 percent;
    v) a tensile strength, as measured by ASTM D412, of from 3,000 to 10,000 psi
    vi) a creep recovery as measured by ASTM D2990-01 of from 30 to 90 percent.

3. The thermoplastic polyurethane composition of claim 1 wherein the polyether polyol has a number average molecular weight from 500 to 3,000.

4. The thermoplastic polyurethane composition of claim 3, wherein said polyether polyol comprises one or more of PTMO, PEG or combinations thereof.

5. The thermoplastic polyurethane composition of claim 1 wherein the chain extender component comprises 1, 4-butanediol.

6. The thermoplastic polyurethane composition of claim 1 wherein the molar ratio of the chain extender component to the polyol component is from 30:1 to 0.5 to 1.

7. The thermoplastic polyurethane composition of claim 1, wherein the chain extender component comprises from 2 wt % to 30 wt % of the total weight of the composition.

8. The thermoplastic polyurethane composition of claim 1 wherein the polyol component further comprises a polycarbonate polyol, a polysiloxane polyol, a polyamide oligomer polyol, or any combinations thereof.

9. The thermoplastic polyurethane composition of claim 1 wherein the chain extender component further comprises one or more additional diol chain extenders, diamine chain extenders, or a combination thereof.

10. The thermoplastic polyurethane composition of claim 1 wherein the thermoplastic polyurethane composition comprises one or more additional additives selected from the group consisting of pigments, UV stabilizers, UV absorbers, antioxidants, lubricity agents, heat stabilizers, hydrolysis stabilizers, cross-linking activators, flame retardants, layered silicates, fillers, colorants, reinforcing agents, adhesion mediators, impact strength modifiers, and antimicrobials.

11. The thermoplastic polyurethane composition of claim 1, wherein the weight ratio of first linear aliphatic diisocyanate to the second aliphatic diisocyanate from 1:1 to 19:1.

12. An article comprising the thermoplastic polyurethane composition of claim 1.

13. A process of making a thermoplastic polyurethane composition, said process comprising the steps of: (I) reacting:
    a) a polyisocyanate component comprising at least a first linear aliphatic diisocyanate selected from 1,6-hexanediisocyanate (HDI) and a second aliphatic diisocyanate selected from bis(isocyanatomethyl)cyclohexane (HXDI) in a weight ratio of from 1:1 to 20:1;
    b) a polyol component comprising at least one polyether polyol, wherein said polyol component is free of polyester polyols; and
    c) a chain extender component comprising at least one diol chain extender of the general formula HO—$(CH_2)_x$—OH wherein x is an integer from 2 to about 6.

* * * * *